Dec. 7, 1943.　　　　S. C. BARNES　　　　2,336,211
AUTOMOBILE DOOR LOCK
Filed June 12, 1941　　　2 Sheets-Sheet 1
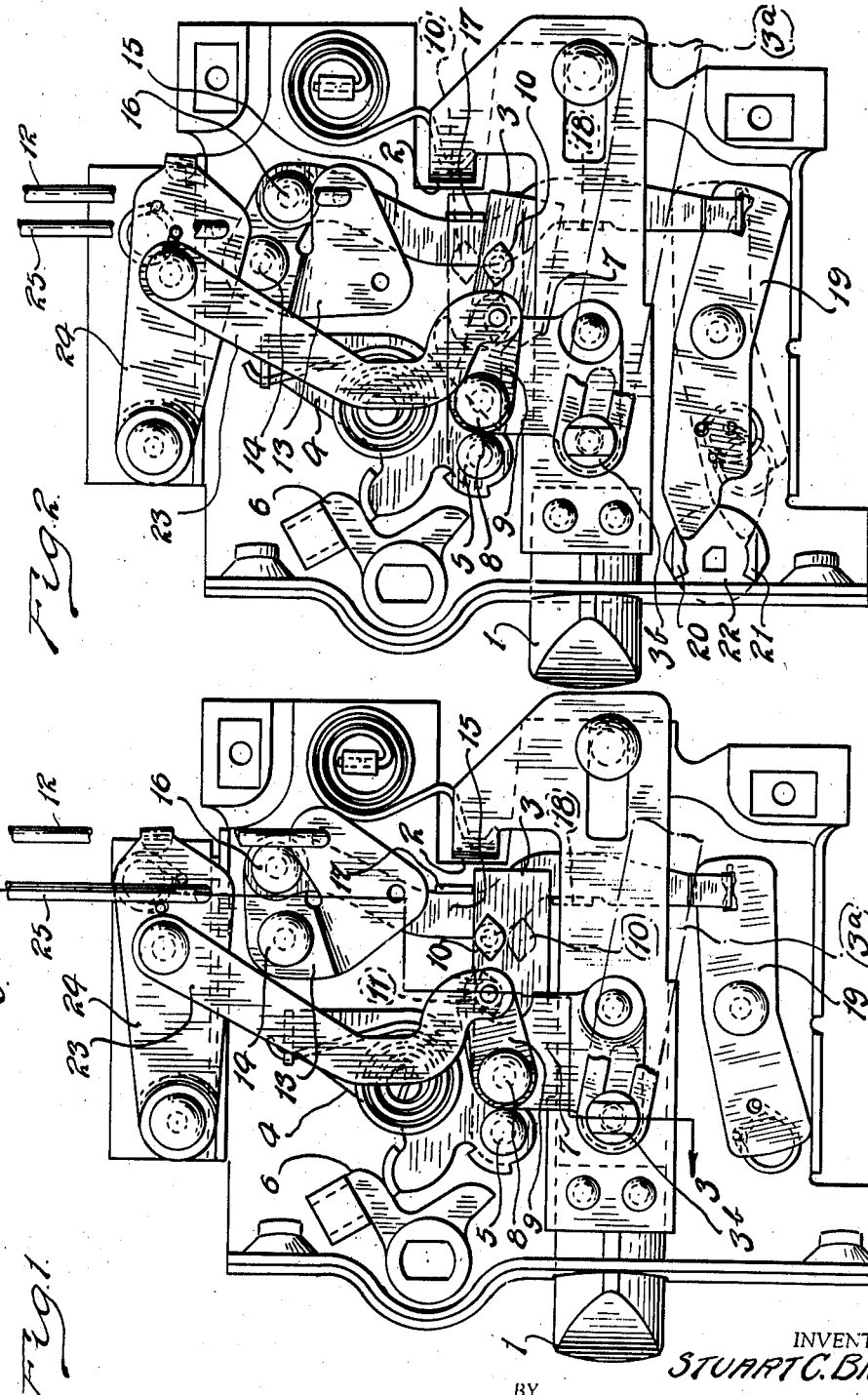
INVENTOR.
STUART C. BARNES.
BY
Barnes, Kisselle, Laughlin & Raisch
ATTORNEYS.

Dec. 7, 1943.   S. C. BARNES   2,336,211
AUTOMOBILE DOOR LOCK
Filed June 12, 1941   2 Sheets-Sheet 2
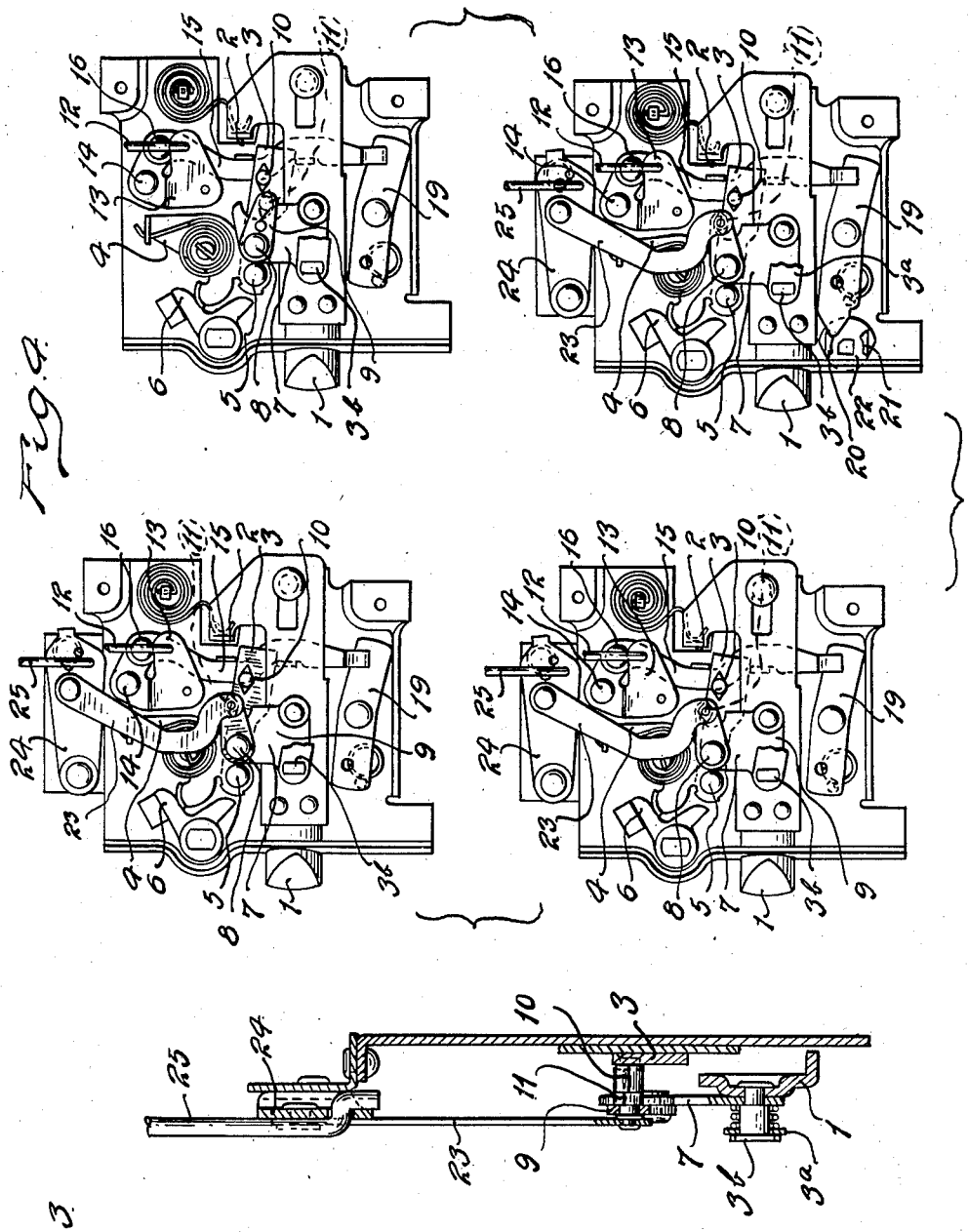
INVENTOR.
STUART C. BARNES.
BY
Barnes, Kisselle, Laughlin & Raisch
ATTORNEYS Patented Dec. 7, 1943

2,336,211

UNITED STATES PATENT OFFICE 2,336,211

AUTOMOBILE DOOR LOCK

Stuart C. Barnes, Detroit, Mich., assignor to Ternstedt Manufacturing Company, Detroit, Mich., a corporation of Michigan Application June 12, 1941, Serial No. 397,656

6 Claims. (Cl. 292—164)

This invention relates to optional self-locking or self-unlocking locks for automobile bodies. Anyone who drives a four-door automobile is aware of the annoyance of having to see that each of the door locks is locked each time the operator leaves the car for parking. This has long been recognized as a problem that needed successful solution. All sorts of coincidental locking systems had been proposed—electrical, mechanical, hydraulic, etc. Many of these have been built and installed in cars but, so far as I am advised, used only experimentally because they presented problems of expense, complication, maintenance, etc., which made automobile manufacturers loath to adopt them.

It is the object of my invention to afford an installation of locks for an automobile which will achieve substantially the results of these complicated coincidental locking systems but in a very simple manner so the cost of these locks is little more than the ordinary lock. It is another object of the invention to provide a lock for an automobile body which will automatically lock the door each time the door is opened and closed, or optionally, the lock can be set so that it will automatically unlock the door each time the door is opened and closed.

In the drawings:

Fig. 1 is an elevation of my improved lock set to always lock the door each time the bolt is retracted.

Fig. 2 is an elevation of the same with the lock set to always unlock the door each time the bolt is retracted.

Fig. 3 is a section on the line 3—3 of Fig. 1.

Fig. 4 is an elevation of the four locks used on the four doors of an automobile, assuming that the front of the automobile is at the right of Fig. 4. The locks at the top are the left-hand locks and the locks at the bottom are the right-hand locks.

In the early days of the closed automobile it was quite common to use a so-called night lock on automobile doors; that is, a lock was used which had a small lever control on the inside of the car so that when this lever was thrown to the "on" position the outside roll back would be dogged on all four doors if each lever was thrown to the "on" position. But many people had the unfortunate experience of getting locked out of their cars. It was then decided that this was rather risky business so Ochsner 1,331,166 introduced a camming device which was located on the bolt and which caused the bolt, each time it was retracted, to undog the outside roll back. It was then customary to use the ordinary night locks on all four doors but this Ochsner safety cam was used to insure the door automatically releasing the night lock if one opened or closed that door. The practice was then to get out the front curb door and lock that door with a key. In this way one never got locked out of his car because he always had his key with him.

A form of keyless lock and yet with the Ochsner safety principle was introduced by the Andersen-Bowlus invention 2,039,873. Andersen and Bowlus had the semi-free wheeling type of handle; that is, a handle which when locked was disconnected from the bolt. This precluded the forcing of the bolt by means of putting a piece of gas pipe on to the outside door handle. Of course, this type of handle was very old. The Andersen-Bowlus invention had a camming arrangement which, at each retraction of the bolt, threw the connecting device back into operating position to connect the outside roll back with the bolt. This was the Ochsner principle adapted to the free wheeling type of handle, but the improvement that Andersen and Bowlus made was an arrangement whereby, if the outside handle is turned to retracted position when the outside roll back is disconnected from the bolt and then the door is closed, the disconnecting device is not thrown back to operative position. The Ochsner principle is put out of operation with the outside handle turned down. It is, therefore, possible with Andersen and Bowlus, on leaving the car to throw down the lever or push button on the inside of the door and then turn the outside handle down and close the door and it is locked without a key. Of course, this keyless locking was accomplished by the ordinary night lock with the inside catch thrown to the locking position but, as already stated, the night lock is a very dangerous thing to use on automobiles because one often gets locked out of his car with the keys on the inside. The Andersen-Bowlus type of lock is provided with the Ochsner safety release principle which always insures, when one gets out of the car, that the lock is automatically disconnected. But if one takes the trouble after he has opened the door to throw down the catch on the door and then takes the further trouble to turn the handle down when he closes the door, the door will lock the same way that the door of the night lock will lock when it is closed, but these two operations have to be deliberate and so challenge the driver that he will ponder as to whether he has taken the keys out of the ignition lock so that he can get into his car when he returns.

Now, what I propose is to provide a lock for at least the two rear doors and, if desired one of the front doors, which will automatically lock each time the bolt is retracted by closing the door regardless of what is the position of the control lever or button on the inside of the car. It will automatically lock the outside handle but the inside handle can always be used to retract the bolt unless it is desired to also lock the inside handle so as to prevent children from playing with the handle and being spilled out of the doors. Then the inside operating members may be connected directly to the outside roll back (Simpson 2,072,317) or both the inside roll back and the outside roll back may operate on the same thrust lever (Simpson application No. 357,-522, filed September 20, 1940) so that when this thrust member is disconnected from the bolt, both the handles are disconnected or when this thrust member is blocked by a dog, both members are blocked. The invention, as worked out in the drawings, is applied to the Andersen-Bowlus type of lock but it may be used with quite different forms of locks, even a lock embodying the dogging principle in place of the free wheeling principle.

Referring to Figs. 1 and 2, 1 designates the usual sliding bolt. 2 is an abutment thereon which is adapted to be contacted by the thrust link 3 when in the position shown in Fig. 1 but which is not contacted with the thrust link 3 when the link is in the position shown in Fig. 2. This thrust link (motion transmitting member) is pivoted on a lever 4 at 5. Lever 4 is adapted to be oscillated by the outside roll back 6. These two elements form the outside retractor. The inside retractor is a link 3a connected with a remote control handle not shown. Link 3a has a slotted connection with pin 3b on the bolt. On the bolt is secured a bracket 7 and at the top of this bracket is a pivot on which swings arm 9 that carries cam 11. This cam 11 is adapted to contact the pointed stud 10 on the thrust link 3 when the thrust link 3 is in the position shown in Fig. 1, every time the bolt is retracted, and the cam will strike the top of the pointed stud and throw the thrust link to the lower or disconnected position as shown by the dotted lines in Fig. 1. This is my improvement for every time the door is closed, no matter what the position of the inside control button or lever is, the door will be automatically locked. This differs from the night lock principle because a control button or lever on the inside of the door always has to be in the correct position to insure the door locking upon closing. My lock locks regardless of what the position of the control member on the inside of the door is. With my invention that lever or button on the inside of the door has no locking function but is used to connect the bolt to allow one to get in from the outside or to allow one to get out from the inside in case it is desired to couple the inside handle in such a way that both outside and inside handles are locked each time in order to insure the safety of children. In short, the usual push button or control button on the inside does not have the usual function of locking the door, but rather the function of unlocking the door.

My idea is that it is much easier for the driver of the car, if anybody wants to get into the rear seat from the outside, to reach around and release the lock by a button on the inside than it is to check all the push buttons or levers on his four-door car every time he gets out in order to see whether his car is locked.

The inside push button (not shown but usually passing through the window garnish molding) is connected with rod 12. This push rod is connected with lever 13 which swings on fulcrum 14. On one arm of this lever link 15 is pivoted at 16. This link has a pair of lugs 17 and 18. Hence, when push rod 12 is push down, it will carry the thrust link 3 down to the inoperative position shown in Fig. 2. When the link 12 is pulled up it pulls the link up to the operative position shown in Fig. 1. It is also possible to operate this link from the outside of the car by throwing lever 19 by means of the lugs 20 and 21 on the end of the cylinder lock cylinder 22. It is now considered advantageous to have cylinder locks on each of the front doors so that one can get into a car from either side. Hence, such a lock as is shown in Fig. 2 can be used on both front doors, if desired, or only on one front door, to wit: the curb side as is shown in Fig. 4. It would be necessary to raise the push link 12 to release the lock on these doors and this is the way that is ordinarily done with cars now equipped with this lock—by pulling up on the push button that projects vertically through the garnish molding. But with my new system of locks it would be preferable to raise the push rod by pushing down on the button passing through the garnish molding and this can be easily arranged by converting the downward movement of the push button into an upward movement of the rod 12 by means of an intervening lever.

In the drawings, I have shown this automatic lock applied to three of the four doors on a car; in fact, it can be applied to any number of them. It is very advantageous to apply it to the two rear doors because these are not used a great deal. The front seat occupant or driver can, without much trouble, take care of the two front doors in the present way; namely, check the inside control on one door and lock the other door as he leaves the car by that doorway. However, my improved lock may be advantageously used on not only the rear doors but one of the front doors, preferably the curb front door. Then when the driver gets out the door immediately adjacent him, the left front door, all he has to do is to follow the principle of locking that has previously been used—lock the door with a key as has been done in some cars, or lock it by first pushing down on the control button on the inside of the door and then turn the handle down as taught by the Andersen-Bowlus invention. Of course, one risk in using my self-locking lock on the right hand door is that the driver may get out of this doorway to reach the curb and then slam the door closed without taking the trouble to find out whether he has taken the keys out of the car. But it is believed that if he is familiar with the Andersen-Bowlus type of lock from using it on the left-hand side of the front compartment, each time he gets out the right-hand side of the car he will consider whether his keys have been taken out of the ignition lock. If the driver does not expect to be out of sight of the car and he leaves the keys in the ignition lock and simply swings the right curb door closed not intending to lock it, but by virtue of the self-locking lock he necessarily locks it, there is little chance he will be locked out of the car because the left-hand front door will ordinarily not be locked. In order to lock this door it must be locked from the inside deliberately and ordinarily there is no occasion to lock it from the inside unless the driver intends to get out the curb door, take the keys and lock the car. The only exception would be in the case of night driving when the driver has locked himself in against the red-light bandit. The red-light bandit is now practically a thing of the past and very few people lock themselves in their cars while driving.

Some drivers may not like this self-locking system as, for instance, in small communities where there is not much fear of theft. Then all one has to do is see that cam 10 is in the position shown in Fig. 2. Then the lock operates in accordance with the Andersen-Bowlus principle. It is a self-unlocking lock each time the bolt is retracted throwing the pointed stud back to the dotted-line position shown in this figure each time the bolt is retracted. It is easy enough to change the lock from an automatic self-locking lock to an automatic self-unlocking lock of the Andersen-Bowlus type by simply throwing the arm carrying cam 11 from the upper position shown in Fig. 1 to the lower position shown in Fig. 2 and this may be done by means of link 23 which connects the arm 9 with lever 24. Lever 24 is connected to rod 25 which may be connected with an exposed stud, screw, or adjusting device (not shown) on the inside of the door for easily changing the lock from a self-locking to a self-unlocking lock.

What I claim is:

1. A self-locking lock for automobile doors or the like having in combination a casing, a bolt movable therein, an outside retractor, a motion transmission member arranged to be contacted by the retractor to retract the bolt, the said transmission member being arranged to move out of operative position and a shiftable cam on said bolt which can be set to throw the transmission member out of operative position, if then in operative position, each time the bolt is retracted otherwise than by the retractor and transmission member or set to throw the transmission member into operative position, if then in inoperative position, each time the bolt is so retracted.

2. A self-locking lock for automobile doors or the like having in combination a casing, a bolt movable therein, an outside retractor, a motion transmission member arranged to be contacted by the retractor to retract the bolt, the said transmission member being arranged to move out of operative position, a shiftable cam on said bolt which can be set to throw the transmission member out of operative position, if then in operative position, each time the bolt is retracted otherwise than by the retractor and transmission member or set to throw the transmission member into operative position, if then in inoperative position, each time the bolt is so retracted and a control means on the inside of the door which can be operated to shift the transmission member into inoperative or operative position.

3. A self-locking lock for an automobile body door, having in combination a bolt, inside and outside handles, retracting mechanism between the outside handle and the bolt and which can be made operative or inoperative with respect to the bolt, means actuated by the movement of the bolt and effective upon the retracting mechanism for making the same inoperative, if not already inoperative, each time the bolt is retracted otherwise than by the said retracting mechanism, and a control member on the inside of the door for rendering the retracting mechanism operative to permit the outside handle to retract the bolt each time the control member is so set.

4. A self-locking lock for an automobile body door, having in combination a bolt, inside and outside handles, retracting mechanism between the outside handle and the bolt and which can be made operative or inoperative with respect to the bolt, a cam associated with the bolt, a cam-operated member operatively connected with the retracting mechanism both operated by the movement of the bolt and effective upon the retracting mechanism for making the same inoperative, if not already inoperative, each time the bolt is retracted otherwise than by the said retracting mechanism, and a control member on the inside of the door for rendering the retracting mechanism operative to permit the outside handle to retract the bolt each time the control member is so set.

5. A self-locking lock for automobile doors or the like comprising a casing, a bolt movable therein, outside and inside handles, outside and inside retractors for said bolt, a transmission member between the bolt and the outside retractor and a cam on said bolt operating each time the bolt is retracted to throw the transmission member out of effective position and thereby make the outside handle ineffective to retract the bolt, provided the retraction is not effected by the outside handle and provided the transmission member is in effective position and control means adapted to be located on the inside of the door for re-establishing the transmission member in effective position.

6. A self-locking lock for automobile doors or the like having in combination a casing, a bolt movable therein, outside and inside handles, an outside retractor, a motion transmission member arranged to be operated by the retractor to retract the bolt, the said transmission member being arranged to move out of operative position and a cam on the movable bolt for moving the said transmission member out of operative position each time the bolt is retracted otherwise than by the retractor and transmission member and provided the transmission member is in the operative position, and a control member adapted to be located upon the inside of the door for re-establishing the transmission member in operative position.

STUART C. BARNES.